United States Patent [19]

Martinussen et al.

[11] 4,166,545

[45] Sep. 4, 1979

[54] METHOD AND APPARATUS FOR TRANSFERRING CARGO BETWEEN AN OCEAN-LOCATED UNIT AND A VESSEL

[75] Inventors: Svein Martinussen; Leiv Roaldsnes, both of Brattvåg; Harald Røed, Vatne, all of Norway

[73] Assignee: A/S Hydraulik Brattvaag, Brattvåg, Norway

[21] Appl. No.: 840,759

[22] Filed: Oct. 11, 1977

[51] Int. Cl.[2] .............................................. B65G 57/58

[52] U.S. Cl. .................................. 414/139; 212/3 R; 254/172; 414/138

[58] Field of Search ........................... 214/13, 14, 152; 254/172, 173; 212/3

[56] References Cited

U.S. PATENT DOCUMENTS

| | | | |
|---|---|---|---|
| 2,941,674 | 6/1960 | Bille | 212/3 |
| 3,309,065 | 3/1967 | Prud'homme et al. | 214/14 X |
| 3,591,022 | 7/1971 | Polyakov et al. | 214/13 |
| 3,662,991 | 5/1972 | Lakiza et al. | 214/14 X |
| 3,804,268 | 4/1974 | Barron et al. | 214/14 |
| 4,025,055 | 5/1977 | Strolenberg | 214/14 X |

*Primary Examiner*—L. J. Paperner

[57] ABSTRACT

Method and apparatus for transferring cargo between an ocean-located unit and a vessel by way of a loading crane or derrick with associated winch and especially at sea under conditions of heavy wave movement. A cargo-supporting hook is subjected during loading and unloading to a controlled wave movement relative to the loading crane or derrick which corresponds to the relative movement between the ocean-located unit and the vessel and is in step with this relative movement.

5 Claims, 3 Drawing Figures

-FIG.2-

METHOD AND APPARATUS FOR TRANSFERRING CARGO BETWEEN AN OCEAN-LOCATED UNIT AND A VESSEL

BACKGROUND OF INVENTION

Field of Invention

This invention relates to a method for transferring cargo between an ocean-located unit and a vessel, that is to say from the unit to the vessel or vice-versa, by way of a loading crane or derrick with associated winch especially under conditions of heavy wave movement at sea, as well to apparatus for carrying out such a method.

By the expression "ocean-located unit" hereinafter is meant a land installation which borders the ocean and various types of work platforms, such as bore rigs and the like, arranged on the ocean together with different types of ocean-going vessels. On transferring cargo between a freighter and a land installation as well, in practice, as at work platforms, it is necessary to take account of the wave movement of the freighter, while on transferring cargo between two freighters, it is necessary to take into account the wave movements of both freighters, that is to say the relative wave movement between the freighters.

On loading and unloading a vessel at an ocean-located unit, significant problems occur if the wave movements are particularly heavy since the loading and unloading work is extremely dangerous, especially for personnel who work on the deck of a freighter. In addition, there is the risk of damaging the cargo, the unloading and loading equipment as well as the vessel itself. There has arisen an increasing need of being able to load and unload freighters during virtually arbitrary weather conditions, especially in connection with oil search and extraction work in oceanic zones and with heavy wave movements at sea.

SUMMARY OF THE INVENTION

With the present invention an objective is to remove or, at any rate, significantly reduce the problems which arise in loading and unloading operations in an oceanic zone with heavy wave movements of the sea.

According to the present invention a method for transferring cargo between an ocean-located unit and a vessel by way of loading crane means with associated winch and especially under conditions of heavy wave movement at sea, comprises subjecting a cargo-supporting hook (or the cargo) during loading and unloading to a controlled wave movement relative to said loading crane means corresponding to the relative movement between said ocean-located unit and said vessel and in step with said relative movement.

In this way, there is the possibility of being able to move the cargo hook or, in other words, the cargo in a controlled manner with the aid of simple means and in a normal lifting and lowering movement, for example, from a freighter to a bore rig or vice-versa since the wave movements to which the freighter is subjected are compensated for by means of the controlled wave movement which the cargo hook or the cargo are exposed to independently of the lifting and lowering movement.

The invention also includes an apparatus for carrying out the method of the penultimate paragraph which comprises the combination of (a) means for recording the relative movement between the ocean-located unit and the vessel, (b) wave-compensating means adapted to draw in or let out loading wire in a controlled forwards and reverse movement independently of the drawing in or letting out of the wire by said winch, and (c) means for controlling the wave-compensating means at least essentially in step with said relative movement indicated by the recording means.

In practice, the recording means can be designed in many different ways with mechanical, acoustic or radio-controlled signal transfer to the means for controlling the wave-compensating means.

By a simple, mechanically controlled solution, a tension-responsive mechanism such as a weight in a line controlled by a special, tension-responsive line which via the loading crane means, can indicate the aforesaid relative movement and actuate the control means for the wave-compensating means.

The wave-compensating means can, in practice, also be given different designs.

In a first embodiment, the wave-compensating means comprises a separate winch having a forwards and reverse operating winch drum for controlling the end of the loading wire opposite that controlled by the winch of the loading crane means.

In a second embodiment, the wave-compensating means comprises a hydraulic cylinder pivotably mounted at one end and having its piston rod projecting outwardly from its other end and a pulley system arranged between the winch and the hook so as to receive the loading wire in its path of movement, a pulley of said system being connected to the piston rod so as to pulsate to and fro with that rod in response to actuation of the hydraulic cylinder by the control means.

In a further embodiment, the wave-compensating means comprises a separate drive motor which, via a differential coupling, is inserted in the drive connection between the drive motor and drum of the loading and unloading winch so that the two motors jointly control the movement of the one end of the loading wire.

BRIEF DESCRIPTION OF THE DRAWINGS

In order that the invention can be more clearly understood, convenient embodiments thereof will now be described, by way of example, with reference to the accompanying drawings in which:

Referring to FIG. 1, a loading and unloading winch 10 has an associated drum **10*a* which lets out and draws in a loading wire 11. The loading wire passes from the drum 10*a* via a guide pulley 12 at the inner end of a loading derrick 13, a first tackle pulley 14 in a tackle block 14,15 at the outer end of the loading derrick, a second tackle pulley 16 which is moveable towards and away from the tackle pulley 14, and a third tackle pulley 15 in the tackle block 14,15 and further downwards to a cargo hook 17 where there is shown suspended a cargo 18 which is to be placed, in position, on board a freighter 19**. In the illustrated embodiment, the loading and unloading equipment is mounted on board an ocean-located unit which can consist of an ocean-located land installation, a bore rig or the like which is anchored in an oceanic zone or an arbitrary vessel (not shown).

Figure 1:
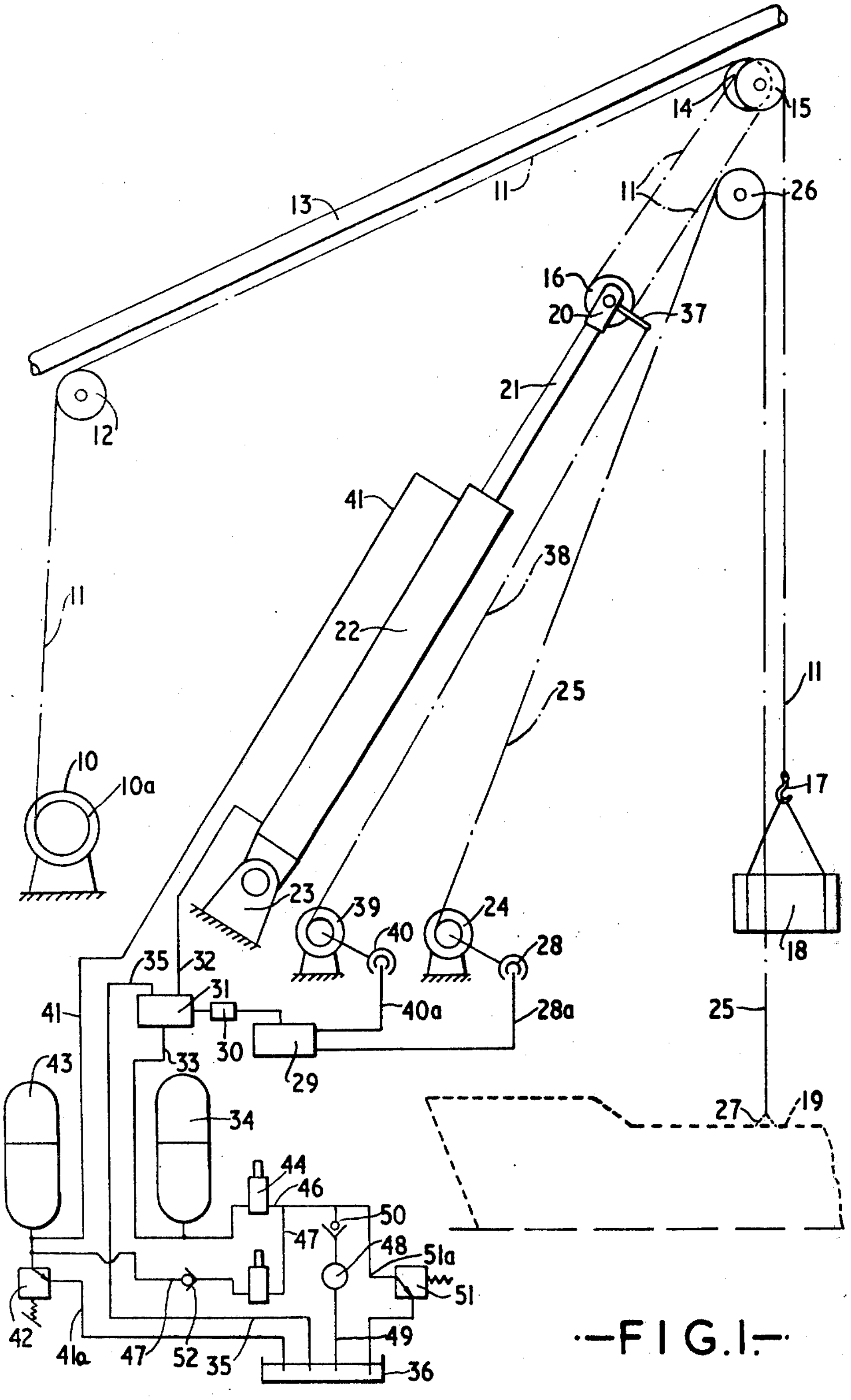
FIG. 1 is a schematic representation of an apparatus according to a first embodiment.

The tackle pulley 16 is secured to a hoop 20 at the end of a piston rod 21 in a hydraulic cylinder 22, the lower end of which is pivotably mounted in a base 23. The tackle pulley 16 is adapted to be set into a pulsating forwards and reverse movement relative to the cylinder as will be described further below, so as to produce a corresponding wave compensation with pulsating shortening and lengthening of the loading wire 11 independently of the operation of the loading wire via drum 10*a* of the loading and unloading winch. The afore-mentioned pulsating forwards and reverse movement of the tackle pulley and the resulting shortening and lengthening of the loading wire serves to compensate, wholly or in part, for the relative vertical movement between the freighter and the ocean-located unit. A mechanical indicator is employed for recording the afore-mentioned relative vertical movement. A line winch 24 is shown with an associated line 25 which passes over a line pulley 26 at the outer end of the loading derrick 13. At the end of the line 25 there is suspended an indicator weight 27 which is shown resting on the deck of the freighter. The line winch is adapted to haul in or let out line in step with the relative movement of the freighter relative to the ocean-located unit controlled by the change in tension which occurs in the line 25. A first signal emitter 28 in connection with the line switch 24 is adapted to transfer, via a lead 28*a*, a control signal to a control unit 29 which, via a control means 30, controls a valve 31. The valve 31 is a three-way valve having a first conduit connection 32 to the lower end of the cylinder 22, a second conduit connection 33 to a pressure medium accumulator 34 and a third conduit connection 35 to pressure discharge tank 36. To the hoop 20 of the tackle pulley 16 there is fastened a position-indicating arm 37. To the arm 37 there is fastened a line 38 which passes in onto the drum of the line winch 39. A second signal emitter 40 in connection with the line winch 39 is adapted, via a lead 40*a*, to transfer a control signal to the control unit 29. The signals from the signal emitter 28 for the indicator weight are tuned with the signals from the signal emitter 40 for the position-indicating arm 37 so that the outgoing loading wire 11 is shortened and lengthened by the movement of the tackle pulley 16 in step with the relative movement between the freighter and the ocean-located unit in a corresponding or, if necessary, in a limited swinging movement. Consequently, one is in a position to be able to compensate for or, it necessary, partially compensate for the mentioned relative movement so that the cargo can be landed on the deck of the freighter in a far more controlled and gentle manner than hiterto, even in heavy seas.

In FIG. 1, the installation is shown in an intermediate position. It can be assumed that the freighter 19 moves initially vertically downwards relative to the cargo 18. This involves a tension increase in the indicator line 25. The aim is to give a cargo a corresponding, downwardly directed movement by letting out the loading wire, that is to say by movement of the piston rod 21 outwardly from the cylinder 22 from the position shown in FIG. 1 so that the cargo follows or largely follows the downwardly directed movement of the freighter. The letting out of the loading wire occurs due to the valve 31 holding open the connection from the pressure accumulator 34 to the lower end of the cylinder 22, while pressure medium from the upper end of the pressure cylinder 22 is led, via a conduit connection 41, discharge valve 42 and a conduit connection 41*a*, to the pressure discharge tank 36.

Immediately the downwardly directed movement of the freighter decreases, that is to say immediately the tension in the indicator line ceases, there is emitted a corresponding signal from the signal emitter 28 of the indicator to the control unit 29 so that the connection between the lower end of the cylinder 22 and the pressure medium accumulator is closed in the valve and the connection between the lower end of the pressure cylinder 22 and the pressure discharge tank 36 is opened. In this way, pressure medium is supplied momentarily to the upper end of the cylinder 22 from a pressure medium accumulator 43 in the conduit connection 41. The piston rod will consequently be pushed inwards into the cylinder 22 and will produce a corresponding drawing in of the loading wire.

Immediately the upwardly directed movement of the freighter decreases, that is to say immediately the tension in the indicator line increases again, the indicator winch is set in the opposite turning direction and there is emitted a corresponding signal from the signal emitter 28 of the indicator to the control unit 29 so that the connection between the lower end of the cylinder and the pressure medium accumulator 34 is opened in the valve 31, while the connection between the lower end of the cylinder and the pressure discharge tank 36 is closed. Immediately there occurs a pressure increase in the upper end of the cylinder 22, pressure medium is led therefrom via the conduit connection 41 to the pressure discharge tank 36.

The indicator weight 27 will consequently follow the vertical movement of the freighter while the indicator line which sits on the deck of the freighter is maintained tightly stretched the whole time and responds to any change in tension as a consequence of the movement of the freighter. The indicator winch is adapted in a manner known per se to respond to such tension arrangements directly and to draw in or let out the indicator line in accordance with the changes in tension. The signal emitter 28 will be controlled correspondingly by the turning of the indicator winch and will, by emitting a signal, control the valve 31 in corresponding movement step.

The pressure in the accumulators 34 and 43 is adjusted according to the conditions by means of control valves 44,45 in their respective conduits 46,47 which are connected to a common pump 48 via a main conduit 49 with non-return valve 50. Between the non-return valve 50 in the main conduit 49 and the conduits 46,47, there is coupled in, a branch conduit 51*a* with discharge valve 51 to the pressure discharge tank. At 52, there is shown a non-return valve in the conduit 47 between the discharge valve 42 and the control valve 45.

The conduit connection 41 between the upper end of the cylinder 22 and the pressure discharge valve 42 can, in practice, with minor modifications (not shown) be utilised without pressure accumulator 43 since the pump 48 via the conduit 47 with the valve 45 can supply the necessary amount of pressure medium directly to the cylinder 22 as required. However, in the illustrated embodiment, the pressure accumulator 43 is employed to discharge the pump to a significant degree during operation, the weight of the cargo 18 being counterbalanced by a corresponding pressure build up in the pressure accumulator 43. The tension p which is exerted in the line 11 from the cargo 18 thus provides a corresponding tension $2p$ in the piston rod 21 via the pulley 16 and produces a corresponding pressure increase in the conduit connection 41 to the pressure accumulator 43. The pressure produced by the cargo in the conduit connection 41 will, in practice, however lie substantially below the opening pressure of the valve 42, and there will be built up a corresponding pressure in the pressure accumulator. By means of the pump 48 via the conduit 47 with the valve 45, the pressure in the conduit connection 41 and in pressure accumulator 43 can, in practice, be increased from the pressure produced by cargo up to or up towards the opening pressure of the valve 42. The pump 48 needs consequently on the pressure side of the pressure cylinder 22 only to work in the pressure region between the opening pressure of the valve 42 and that pressure which is produced in the conduit connection 41 by the weight of the cargo, that is to say the larger the weight of the cargo is, the larger is the pressure energy which can be stored up in the accumulator 43 and the more one can relatively discharge the pump 48.

The signal emitter 40 which actuates the control unit 29, is controlled by the movement of the position-indicating arm 37 on the tackle pulley 16 and is calibrated relative to the signal emitter 28 so that one gets approximately half of the movement of the indicator line 25 in the line 38. In the calibration there can, if necessary, be inserted a certain time delay or a varying movement relationship in the tackle pulley 16 relative to the indicator weight, for example, in order to correct for possible extra horizontally directed, relative movements between the ocean-located unit and the freighter. It can also be provided for that the desired wave movement is transferred to the cargo in a gradually increasing manner with increasing size of the wave movement, by manually controlling the signal emitters or in another way (not shown).

However, it is apparent that instead of the illustrated mechanical response with the indicator weight, the indicator line with associated winch and signal emitter, there can be used other indicators with, for example, radio-controlled or acoustically controlled indicators.

Figure 2:
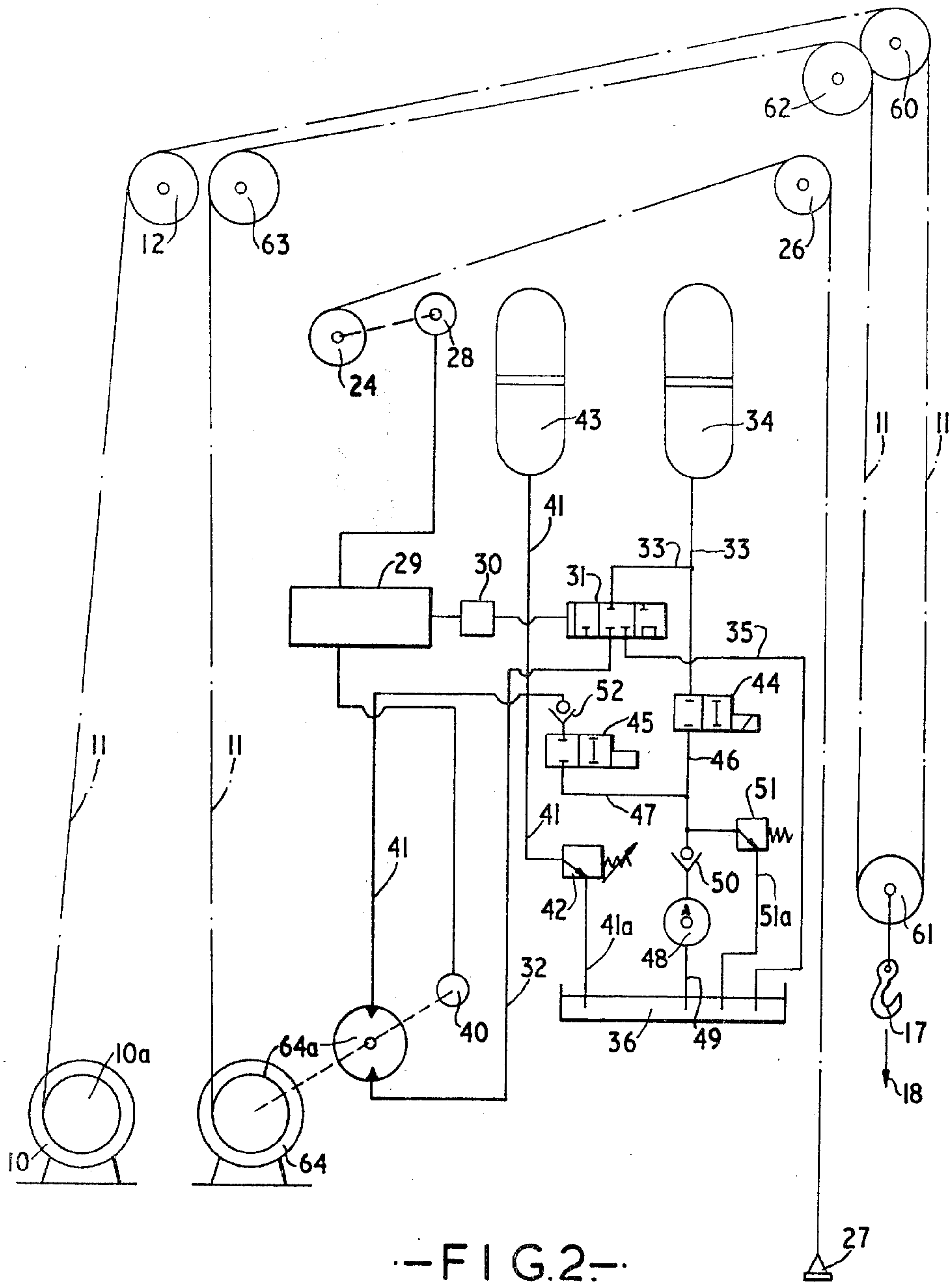
FIG. 2 is a schematic representation of an apparatus according to a second embodiment.

In FIG. 2, there is shown a modified construction in which there is employed a loading and unloading winch 10 having an associated drum 10a which lets out or draws in a loading wire 11. The loading wire passes from the drum 10a via a guide pulley 12 at the inner end of a loading derrick (not shown) and a first pulley 60 at the outer end of the loading derrick, further downwards to a block pulley 61 where the cargo hook 17 is suspended. From the block pulley 61, the loading wire 11 passes upwards to a second pulley 62 at the outer end of the loading derrick and via a guide pulley 63 to a drum 64a on a winch 64. The motor on a winch 64 replaces the pressure medium cylinder of FIG. 1. There is illustrated a hydraulic system corresponding to that which is shown in FIG. 1.

Figure 3:
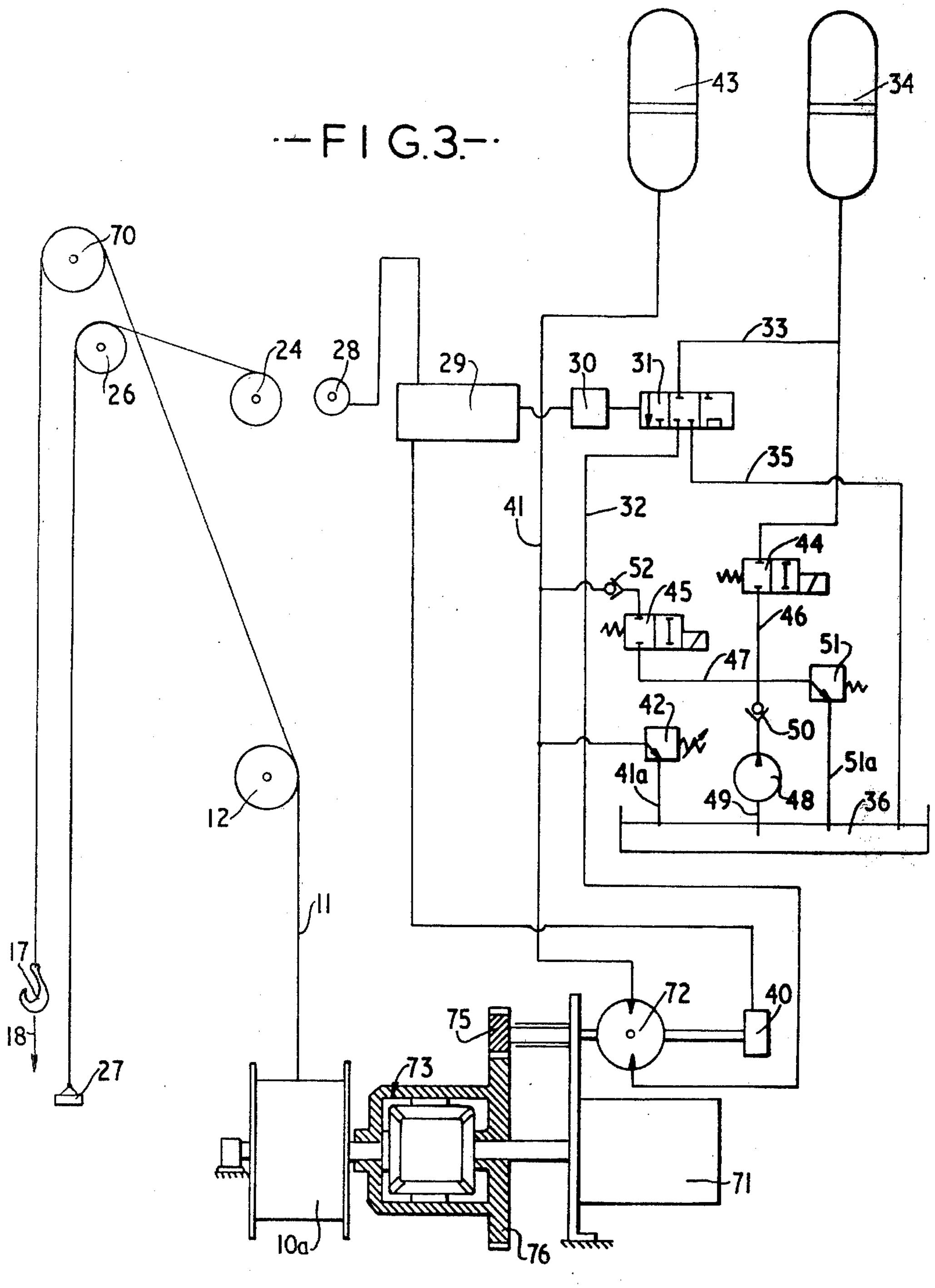
FIG. 3 is a schematic representation of an apparatus which is a modification of the apparatus of FIG. 1.

In FIG. 3, there is illustrated a further modified construction where the loading wire 11 passes from a drum 10a via a guide pulley 12 at the inner end of the loading derrick and a guide pulley 70 at the outer end of the loading derrick (not shown) to the cargo hook 17 at the outer end of the loading wire. The drawing in and letting out of the loading wire 11 on the drum 10a is controlled in a winch aggregate of two separate winch motors 71,72 which are each driven in a mutually independent manner, via a common differential coupling 73 for the motors. A first motor 71 corresponds to the motor of a conventional loading and unloading winch and is only indicated schematically in FIG. 3, the drive system of the motor being omitted for the sake of simplicity. A second motor 72 can correspond to the motor in the winch 64 of FIG. 2, and in the illustrated embodiment there is shown an indicator signal emitter 40 fastened to the one side of the shaft of the motor 72, while the other side of the shaft of the motor is connected to a toothed wheel 75 which engages a gear rim 76 on the differential coupling 73. Normally one will be able to raise and lower the cargo hook via the drum 10a by conventional operation via the winch motor 71. Independently of this operation, one can, in a corresponding manner as indicated above, compensate for the relative movement between the ocean-located unit and the freighter, by separate control by the motor 72 via indicator signal emitter 40. The wave-compensating movement is thus supplied directly to the gear rim 76 of the differential coupling so that the resultant movement which is produced in the loading wire is controlled directly via the common one drum 10a of the winch aggregate.

In the illustrated embodiments, there are described hydraulic winches with associated hydraulic auxiliary components but it is apparent that steam winches, electro-winches or pneumatic winches can be utilised equally well, and that together with these auxiliary components can be employed having an electrical or another arbitrary mode of operation.

We claim:

1. Apparatus for transferring cargo either way between an ocean-located unit and a vessel by means of loading crane means with associated loading and unloading winch and especially under conditions of heavy wave movement at sea, which comprises the combination of (a) means for recording the relative movement between said ocean-located unit and said vessel, (b) wave-compensating means incorporating drive means therefor which when actuated enables loading wire to be drawn in or paid out in a controlled forwards and reverse movement independently of the drawing in or paying out of the wire by said winch, and (c) means for controlling said wave-compensating means via its drive means and at least essentially in step with said relative movement indicated by said recording means, said control means comprising first and second control systems adapted to be actuated in unison in response to said relative movement thereby actuating said drive means, said first control system including a pressure accumulator, a source of pressure medium, a pressure discharge valve arranged between said accumulator and said source of pressure medium, a pump for the supply of pressure medium from said source and a valve arranged between said pump and said accumulator for controlling the pressure in said accumulator, said accumulator permitting the passage of pressure medium between said drive means and said source of pressure medium via said discharge valve enabling loading wire to be paid out by said wave-compensating means and via said pump and said control valve enabling said loading wire to be drawn in by said wave-compensating means with the weight of the cargo being counterbalanced by a corresponding pressure build up in said pressure accumulator.

2. Apparatus according to claim 1, wherein the wave-compensating means has as its drive means a separate winch having a forwards and reverse operating winch drum for controlling the end of the loading wire opposite that controlled by said loading and unloading winch of said loading crane means.

3. Apparatus according to claim 1, wherein the wave-compensating means has as its drive means a hydraulic cylinder pivotably mounted at one end and having its piston rod projecting outwardly from its other end and further comprises a pulley system arranged between said loading and unloading winch and said hook so as to receive said loading wire in its path of movement, a pulley of said system being connected to said piston rod so as to pulsate to and fro with that rod in response to actuation of the hydraulic cylinder by the control means.

4. Apparatus according to claim 1, wherein said second control system includes a valve for controlling communication of pressure medium between said drive means, a second pressure accumulator and said source of pressure medium, said valve being actuable to open the communication between said drive means and said second pressure accumulator and to close the communication between said drive means and said source of pressure medium enabling loading wire to be paid out by said wave-compensating means, as well as being actuable to close communication between said drive means and said second pressure accumulator and to open communication between said drive means and said source of pressure medium enabling loading wire to be drawn in by said wave-regulating means.

5. Apparatus according to claim 1, wherein said loading and unloading winch comprises a drive motor and a drum drivably connected therewith and said wave-compensating means comprises a separate drive motor as its drive means and a differential coupling, said separate drive motor being inserted via said differential coupling in the drive connection between said drive motor and said drum of said winch enabling joint control of the movement of one end of the loading wire by said two motors.

* * * * *